United States Patent Office

2,791,595
Patented May 7, 1957

2,791,595

LONG CHAIN ESTERS OF NITROPHENYLAMINO-PROPANEDIOLS AND PREPARATION THEREOF

William H. Edgerton, Huntington Woods, Mich., assignor to Parke, Davis & Company, Detroit, Mich., a corporation of Michigan No Drawing. Application January 14, 1953,
Serial No. 331,305

11 Claims. (Cl. 260—404.5)

This invention relates to a process for producing certain therapeutically valuable esters and to intermediate products useful in the production of such esters. More particularly, the present invention relates to a method for producing esters having the general formula

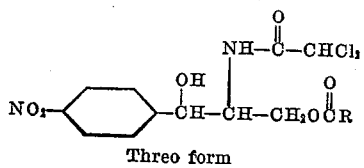

Threo form where R is an aliphatic hydrocarbon radical containing seven to nineteen carbon atoms inclusive.

From the following description it will be apparent to those skilled in the art that the 1-p-nitrophenyl-2-aminopropane-1,3-diol derivatives used as the starting material and the ester products of the invention exist in structural or diastereo-isomeric as well as optical isomeric form. The present invention is concerned with compounds having the "threo" diastereoisomeric as distinguished from the "erythro" diastereoisomeric form. The groups on the two asymmetric carbon atoms of such threo diastereoisomers have the same relative spacial configuration or arrangement as the groups on the two asymmetric carbon atoms of pseudo ephedrine and threose.

Because of the difficulty in representing these structural differences in graphic formulae, the customary structural formulae will be used in both the specification and claims and a notation placed below or to the side of the formula to designate the particular structural and optical configuration of the compound. Where the notation "threo form" appears, as it does above, the formula is to be interpreted in its generic sense, that is, as representing the "D-threo" and "L-threo" isomers in separated form as well as the racemic mixture thereof. Such a formula does not merely represent the optical mixture. In the specific formulae the notation (+) will be used to designate dextro optical rotation and the notation (−) to designate levo optical rotation.

In accordance with the invention threo-1-p-nitrophenyl-2-dichloroacetamido-3-acyloxypropane-1-ol compounds having the formula given above are produced by reacting a Schiff base of a threo-1-p-nitrophenyl-2-aminopropane-1,3-diol of formula

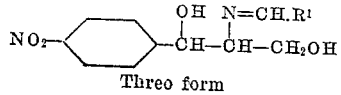

Threo form with an acyl halide, R—CO—X, or acyl anhydride, (R—CO)₂O, thereby producing a Schiff base of a threo-1-p-nitrophenyl-2-amino-3-acyloxypropane-1-ol of formula

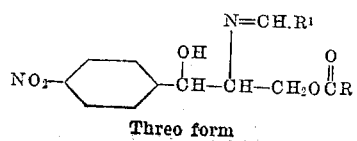

Threo form hydrolyzing the Schiff base by treatment with aqueous acid, thereby producing an acid addition salt of a threo-1-p-nitrophenyl-2-amino-3-acyloxypropane-1-ol of formula

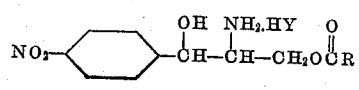

Threo form and thereafter N-dichloroacetylating the said acid addition salt of the threo-1-p-nitrophenyl-2-amino-3-acyloxypropane-1-ol or, after neutralization, the free base thereof; where R is an aliphatic hydrocarbon radical containing seven to nineteen carbon atoms inclusive, $R^1$ is a phenyl, a substituted phenyl group or a heterocyclic group, X is a halogen atom and HY is one equivalent of a mineral acid. The transformations involved in the process can be diagrammatically illustrated as follows:

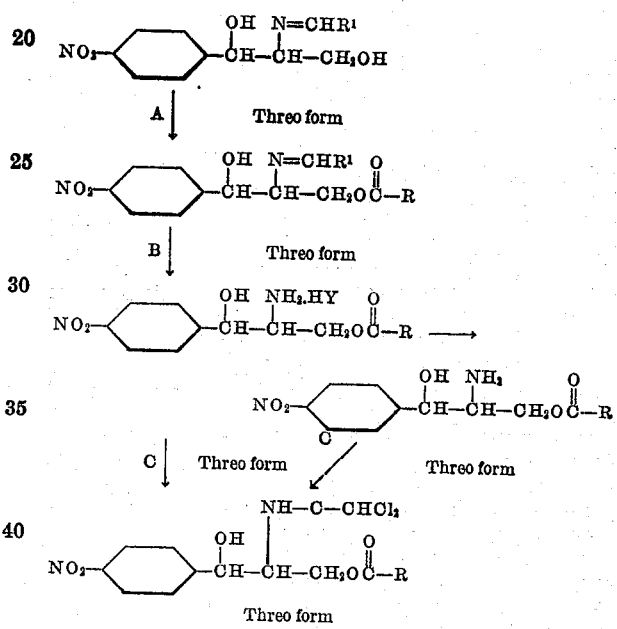

where R, $R^1$ and HY have the same significance as indicated above.

As mentioned in the foregoing description, the transformation designated as A is brought about by reacting an acyl halide or anhydride with a Schiff base of a threo-1-p-nitrophenyl-2-aminopropane-1,3-diol of the formula

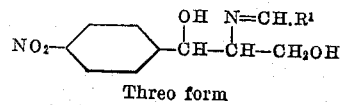

Threo form wherein $R^1$ is a phenyl group, a substituted phenyl group such as phenyl groups substituted with alkyl, alkoxy, halogen and nitro groups, a heterocyclic group or a like group. The nature of the substituents in the $R^1$ group is not particularly critical and hence it is preferable to employ the Schiff bases derived from the more common aromatic aldehydes such as benzaldehyde, m-methoxy-p-hydroxybenzaldehyde, m-methylbenzaldehyde, anisaldehyde, m-chlorobenzaldehyde, o-nitrobenzaldehyde, furfural and similar aldehydes. The reaction is preferably carried out under anhydrous conditions in a basic medium. The preferred media are the N,N-dialkylamides of lower fatty acids such as N,N-dimethyl formamide, N,N-dimethyl acetamide, N,N-diethyl formamide, tertiary organic amines such as pyridine and the like. If desired, an inert organic solvent such as benzene, xylene, toluene, dioxane and the like can be used but it is usually more convenient to employ a large excess of the weakly basic medium. Best results are obtained when an acyl halide is employed as the acylating agent. The temperature during the process can be varied somewhat but in general there is no particular advantage in employing a temperature above 50° C. Room temperatures are preferred and, when a basic catalyst is used, it is unnecessary to employ elevated temperatures since the reaction proceeds readily at temperatures in the neighborhood of 20 to 35° C. In practicing the present invention, best results are obtained when approximately equivalent quantities of the Schiff base of threo - 1 - p - nitrophenyl - 2 - aminopropane - 1,- 3-diol and acylating agent are used but, of course, an excess up to 10 to 20% of either reactant can be used if desired.

The hydrolysis step (B in the above diagram) can be carried out by reacting the Schiff base of the threo 1-p-nitrophenyl - 2 - amino - 3 - acyloxypropane - 1 - ol under aqueous conditions in the presence of mineral acid. In carrying out the process any mineral acid can be used. For example, hydrochloric acid, hydrobromic acid, sulfuric acid, phosphoric acid and the like can be employed. The reaction is usually carried out in the presence of an inert organic solvent. Various organic solvents can be used. For example, methanol, ethanol, isopropanol, ether, acetone, dioxane, benzene, toluene, and the like may be employed. Conveniently, the organic solvent is employed in a preparation sufficient to cause precipitation of the acid salt product of hydrolysis from the reaction mixture. The reaction temperature can be varied widely but in general there is no particular advantage in employing a temperature above 50° C. Room temperatures are preferred since the reaction proceeds readily at temperatures in the neighborhood of 20 to 35° C. The proportions of the reacting materials are not particularly critical but, of course, sufficient acid should be employed to bring about complete hydrolysis. Preferably, the Schiff base referred to and the acid are employed in equimolar proportion and an excess of water is employed.

The N-dichloroacetylation (C in the above diagram) of the acid addition salt of the threo 1-p-nitrophenyl-2-amino-3-acyloxypropane-1-ol compound or, after neutralization, of the free base of said compound can be carried out in several ways. As dichloroacetylating agents dichloroacetyl halides, dichloroacetic anhydride, esters of dichloroacetic acid, N-acyl dichloroacetamides, pentachloroacetone, chloral cyanohydrin and a combination of chloral and alkali metal cyanide and alkali may be used. When employing the free base of the amino diol compound as the starting material any of the foregoing dichloroacetylating agents are suitable. However, when the amino acyloxy alcohol compound is in the form of an acid addition salt an alkaline material should be added to the reaction mixture to liberate the free amino acyloxy alcohol compound in situ before dichloroacetylation or dichloroacetic anhydride, a dichloroacetyl halide, chloral cyanohydrin or the aforementioned chloral combination should be used as the dichloroacetylating agent. The dichloroacetylation can be carried out under either aqueous or anhydrous conditions as will be apparent from the description of the specific dichloroacetylating methods which follow.

The preferred method of dichloroacetylation involves the use of the free base of the threo 1-p-nitrophenyl-2-amino-3-acyloxypropane-1-ol compound and a lower alkyl ester of dichloroacetic acid. The reaction is carried out under anhydrous conditions either in the presence or absence of a solvent such as an alkyl ester of a lower fatty acid, a lower aliphatic alcohol, dioxane and the like. In carrying out the reaction, temperatures up to about 120° C. can be used but for most purposes a temperature of 75° C. or less is satisfactory. Substantially the same conditions are employed when using pentachloroacetone as the dichloroacetylating agent.

When using a dichloroacetyl halide or dichloroacetic anhydride as the dichloroacetylating agent the amino diol compound can be in either the free base or acid addition salt form and either anhydrous or aqueous conditions can be employed. When carrying out the reaction under anhydrous conditions the amino diol or its acid addition salt is brought into contact with the dichloroacetylating agent at a temperature below about 125° C. either in the presence or absence of an inert organic solvent. When the starting material is an acid addition salt the reaction proceeds more slowly than it does when the free amino diol is employed and consequently it is preferable to employ a higher reaction temperature and prolong the reaction time. The dichloroacetyl halides react much more rapidly than does dichloroacetic anhydride and therefore when using the dichloroacetyl halides lower reaction temperatures and shorter reaction times are employed. As solvents, benzene, toluene, xylene, dioxane and the like as well as an excess of the acylating agent can be used.

The reaction between the dichloroacetyl halides or dichloroacetic anhydride and the amino diol compound can also be carried out under aqueous conditions in the presence of an alkaline substance. This is usually accomplished by employing a two phase reaction mixture wherein the amino diol is dissolved in an organic solvent such as ethyl acetate or the like and the organic solvent solution shaken with the dichloroacetylating agent and an aqueous solution of the alkaline catalyst. The best results are obtained when the reaction temperature is maintained below about 30° C. and the mixture kept alkaline by the periodic addition of the acylation catalyst. As basic catalysts the alkali metal bicarbonates, carbonates and hydroxides can be used.

If desired, dichloroacetylation may be accomplished by reacting the free base of the threo 1-p-nitrophenyl-2-amino-3-acyloxypropane-1-ol compound with an N-acylated dichloroacetamide. Of particular interest as dichloroacetylating agents are those N-acylated dichloroacetamides in which the N-acyl substituent is derived from a lower aliphatic carboxylic acid, a halogen substituted lower aliphatic carboxylic acid, an alkoxy substituted lower aliphatic acid, benzoic acid, a benzoic acid containing one or more ring substituents such as alkyl, alkoxy, halogen and nitro and the like groups. In carrying out the process alcoholic, aqueous, or aqueous alcoholic solvents may be used. For example, water, aqueous methanol, aqueous ethanol, methanol, ethanol, isopropanol, butanol, and the like can be employed. The reaction can be carried out at a temperature below 50° C. but it is preferable to carry it out at about room temperature, that is 20 to 30° C.

Dichloroacetylation of the free base, that is of the threo-1-p-nitrophenyl - 2 - amino - 3 - acyloxypropane - 1-ol compound, may also be accomplished by reaction with chloral cyanhydrin or a chloral cyanhydrin yielding material, in the presence of an acid-binding agent, at a temperature below about 100° C. Preferred acid binding agents are sodium bicarbonate, magnesium oxide, pyridine, trialkylamines such as triethylamine, and the like. The reaction medium may be an aqueous or nonaqueous inert organic medium, the preferred medium being dioxane when using chloral cyanhydrin. When using a chloral cyanhydrin yielding material, it is important to employ a medium which contains at least a minor portion of water. As chloral cyanhydrin yielding materials it is preferable to employ chloral and an alkali metal cyanide in conjunction with an aqueous reaction medium at a temperature between 60 and 100° C. The preferred reaction temperature using chloral cyanhydrin is between 0 and 25° C. When using an acid addition salt of the 1-p-nitrophenyl-2-amino-3-acyloxypropane-1-ol as the starting material an extra equivalent of the acid binding agent is employed in order to liberate the free base in situ.

The invention is illustrated by the following examples.

*Example 1*

(a) A suspension of 58.3 g. of benzaldehyde and 106 g.

of D-(—)-threo-1-p-nitrophenyl-2-aminopropane-1,3-diol in 600 ml. of absolute ethanol is heated at reflux for 6 hours. The reaction mixture is concentrated in vacuo and cooled. The desired product having the formula

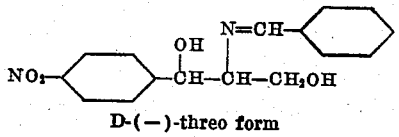

D-(—)-threo form precipitates out and is filtered and recrystallized from ethanol; $[\alpha]_D^{26} = -130°$ in absolute ethanol (1.52%).

A solution of 15 g. of D-(—)-threo-1-p-nitrophenyl-2-benzalaminopropane-1,3-diol, 6 ml. of anhydrous pyridine, and 80 ml. of anhydrous dimethyl formamide is stirred rapidly while 14 g. of palmitoyl chloride is added drop-wise. The mixture is stirred for 4 hours and then poured into a large excess of water with rapid stirring. The product which separates in a supernatant layer is D-(+)-threo-1-p-nitrophenyl-2-benzalamino-3-palmitoyloxypropane-1-ol. The formula of this product is

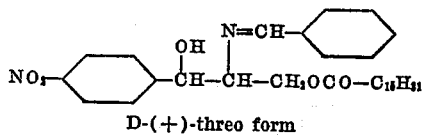

D-(+)-threo form (b) The D-(+)-threo-1-p-nitrophenyl-2-benzalamino-3-palmitoyloxypropane-1-ol obtained in step (a) is dissolved in about 300 ml. of ether and the solution is saturated with hydrogen chloride gas. Dilution with ether and saturation with hydrogen chloride is continued intermittently for two weeks. The desired D-(+)-threo-1-p-nitrophenyl-2-amino-3-palmitoyloxypropane-1-ol hydrochloride precipitates out in the form of a white solid and is collected and recrystallized from ethyl acetate; $[\alpha]_D^{26} = +6.2°$ in dimethyl acetamide (1.46%) and $+9.5°$ in absolute ethanol (0.9%). The formula of this product is

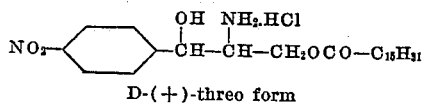

D-(+)-threo form (c) A suspension of 2.4 g. of D-(+)-threo-1-p-nitrophenyl-2-amino-3-palmitoyloxypropane-1-ol hydrochloride in a solution of 1.3 g. of dichloroacetic anhydride and 40 ml. of benzene is heated at reflux for 24 hours. Insoluble material is separated by filtration and discarded. The filtrate is concentrated to 15 ml. and diluted to turbidity with petroleum ether. Upon cooling an oil layer separates. The oil layer is collected and washed with small amounts of water followed by washing with sodium bicarbonate solution. The washed oil layer is taken up in a minimum of hot xylene and after standing at a temperature of about 0 to 10° C., the desired D-(+)-threo-1-p-nitrophenyl-2-dichloroacetamido-3-palmitoyloxypropane-1-ol crystallizes out and is recovered. This product which is a white crystalline solid melts at 90° C. after recrystallization from xylene; $[\alpha]_D^{26} = +5.1°$ in ethyl acetate. It has the formula

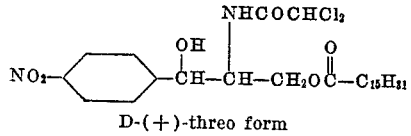

D-(+)-threo form (d) A mixture consisting of 2.4 g. of D-(+)-threo-1-p-nitrophenyl-2-amino-3-palmitoyloxypropane-1-ol hydrochloride, 100 ml. of ether and 100 ml. of a saturated aqueous solution of sodium bicarbonate is shaken until all the solid dissolves. The ether layer is separated, washed with water and dried. Evaporation of the ether yields the desired D-(+)-threo-1-p-nitrophenyl-2-amino-3-palmitoyloxypropane-1-ol. The formula of this product is

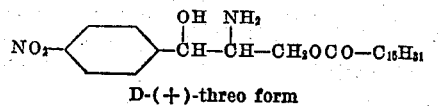

D-(+)-threo form

A solution consisting of 4 g. of D-(+)-threo-1-p-nitrophenyl-2-amino-3-palmitoyloxypropane-1-ol and 20 ml. of methyl dichloroacetate in 40 ml. of methanol is heated under reflux for forty-eight hours. The methanol is removed by distillation and the residue washed with petroleum ether. The solid product is collected, dissolved in xylene and the solution diluted to the point of turbidity with petroleum ether. Upon standing the desired D-(+)-threo-1-p-nitrophenyl-2-dichloroacetamido-3-palmitoyloxypropane-1-ol separates from the solution; M. P. 90° C. after recrystallization from xylene; $[\alpha]_D^{26} = +5.1$ in ethyl acetate. The formula of this product is

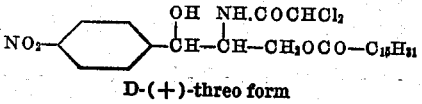

D-(+)-threo form

Example 2

(a) A solution of 17.2 g. of the Schiff base of o-nitrobenzaldehyde and D-(—)-threo-1-p-nitrophenyl-2-aminopropane-1,3-diol, 6 ml. of anhydrous pyridine, and 80 ml. of anhydrous dimethyl formamide are stirred vigorously while 15.5 g. of stearoyl chloride is added drop-wise. The reaction mixture is stirred for 4 hours and then poured into an excess of water with rapid stirring. The product which separates in the oil layer is the Schiff base of o-nitrobenzaldehyde and D-(+)-threo-1-p-nitrophenyl-2-amino-3-stearoyloxypropane-1-ol. This product has the formula

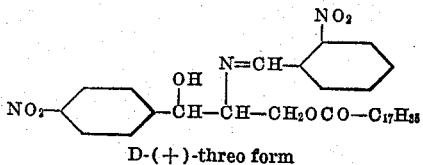

D-(+)-threo form (b) The Schiff base product obtained in (a) is dissolved in 300 ml. of ether and the clear solution saturated with dry hydrogen chloride gas. Stirring of the reaction mixture is continued for 4 hours, following which the reaction mixture is neutralized with saturated sodium bicarbonate solution. The oil layer containing the desired D-(+)-threo-1-p-nitrophenyl-2-amino-3-stearoyloxypropane-1-ol is collected and washed with small amounts of water, ether is removed in vacuo, and the product recrystallizes from ethyl acetate. The formula of the product is

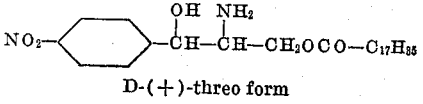

D-(+)-threo form (c) A solution consisting of 4 g. of D-(+)-threo-1-p-nitrophenyl-2-amino-3-stearoyloxypropane-1-ol and 20 ml. of methyl dichloroacetate in 40 ml. of methanol is refluxed for forty-eight hours. The methanol is distilled off and the residue washed with petroleum ether. The solid product is collected, dissolved in xylene, and the solution is diluted to the point of turbidity with petroleum ether. The desired D-(+)-threo-1-p-nitrophenyl-2-dichloroacetamido-3-stearoyloxypropane-1-ol separates from the solution upon standing, which upon recrystallization from benzene has a melting point of 91–92° C. The formula of this product is

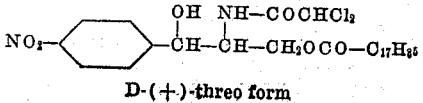

D-(+)-threo form

Example 3

(a) A suspension of 58.3 g. of benzaldehyde and 106 g. of DL-threo-1-p-nitrophenyl-2-aminopropane-1,3-diol in 600 ml. of absolute ethanol is heated at reflux for 6 hours. The reaction mixture is concentrated in vacuo and cooled. The desired product having the formula

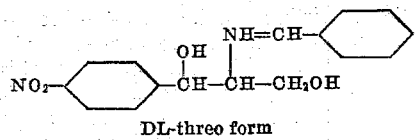

DL-threo form precipitates out and is filtered and recrystallized from ethanol.

A solution of 15 g. of DL-threo-1-p-nitrophenyl-2-benzalaminopropane-1,3-diol, 6 ml. of anhydrous pyridine, and 80 ml. of anhydrous dimethyl formamide is stirred rapidly while 14 g. of palmitoyl chloride is added dropwise. The mixture is stirred for 4 hours and then poured into a large excess of water with rapid stirring. The product which separates in a supernatant layer is DL-threo-1-p-nitrophenyl-2-benzalamino-3-palmitoyloxypropane-1-ol. The formula of this product is

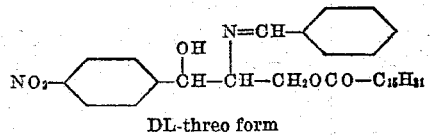

DL-threo form (b) The DL-threo-1-p-nitrophenyl-2-benzalamino-3-palmitoyloxypropane-1-ol obtained in step (a) is dissolved in about 300 ml. of dry ether and the solution is saturated with hydrogen chloride gas. Dilution with ether and saturation with hydrogen chloride is continued intermittently for two weeks. The desired DL-threo-1-p-nitrophenyl-2-amino-3-palmitoyloxypropane-1-ol hydrochloride precipitates out in the form of a white solid and is collected and recrystallized from ethyl acetate; M. P.=147–149° C.

(c) A suspension of 2.4 g. of DL-threo-1-p-nitrophenyl-2-amino-3-palmitoyloxypropane-1-ol hydrochloride in a solution of 1.3 g. of dichloroacetic anhydride and 40 ml. of benzene is heated at reflux for 24 hours. Insoluble material is separated by filtration and discarded. The filtrate is concentrated to 15 ml. and diluted to turbidity with petroleum ether. Upon cooling an oil layer separates. The oil layer is collected and washed with small amounts of water followed by washing with sodium bicarbonate solution. The washed oil layer is taken up in a minimum of hot xylene and after standing at a temperature of about 0 to 10° C., the desired DL-threo-1-p-nitrophenyl-2-dichloroacetamido-3-palmitoyloxypropane-1-ol crystallizes out and is recovered. This product which is a white crystalline solid (M. P.=90–91° C.) has the formula

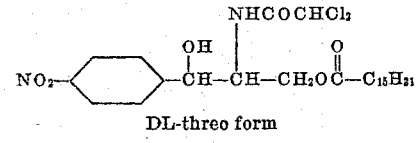

DL-threo form (d) A mixture consisting of 2.4 g. of DL-threo-1-p-nitrophenyl-2-amino-3-palmitoyloxypropane-1-ol hydrochloride, 100 ml. of ether and 100 ml. of a saturated aqueous solution of sodium bicarbonate is shaken until all the solid dissolves. The ether layer is separated, washed with water and dried. Evaporation of the ether yields the desired DL-threo-1-p-nitrophenyl-2-amino-3-palmitoyloxypropane-1-ol. The formula of this product is

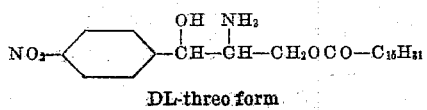

DL-threo form

A solution consisting of 4 g. of DL-threo-1-p-nitrophenyl-2-amino-3-palmitoyloxypropane-1-ol and 20 ml. of methyl dichloroacetate in 40 ml. of methanol is heated under reflux for forty-eight hours. The methanol is removed by distillation and the residue washed with petroleum ether. The solid product is collected, dissolved in xylene and the solution diluted to the point of turbidity with petroleum ether. Upon standing the desired DL-threo-1-p-nitrophenyl-2-dichloroacetamido-3-palmitoyloxypropane-1-ol separates from the solution; M. P.= 90–91° C. The formula of this product is

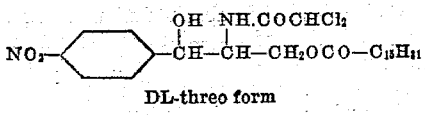

DL-threo form

Example 4

(a) A suspension of 58.3 g. of benzaldehyde and 106 g. of D-(−)-threo-1-p-nitrophenyl-2-aminopropane-1,3-diol in 600 ml. of absolute ethanol is heated at reflux for 6 hours. The reaction mixture is concentrated in vacuo and cooled. The desired product having the formula

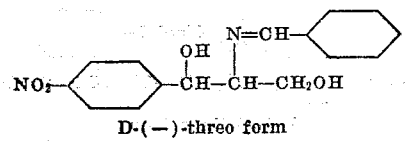

D-(−)-threo form precipitates out and is filtered and recrystallized from ethanol; $[\alpha]_D^{26} = -130°$ in absolute ethanol (1.52%).

A solution of 15 g. of D-(−)-threo-1-p-nitrophenyl-2-benzalaminopropane-1,3-diol, 6 ml. of anhydrous pyridine, and 80 ml. of anhydrous dimethyl formamide is stirred rapidly while 14 g. of palmitoyl chloride is added drop-wise. The mixture is stirred for 4 hours and then poured into a large excess of water with rapid stirring. The product which separates in a supernatant layer is D-(+)-threo-1-p-nitrophenyl-2-benzalamino-3-palmitoyloxypropane-1-ol. The formula of this product is

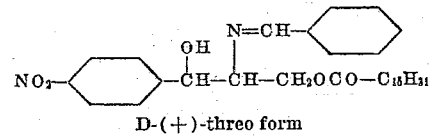

D-(+)-threo form (b) 16 g. of D-(+)-threo-1-p-nitrophenyl-2-benzalamino-3-palmitoyloxypropane-1-ol obtained in step (a) is dissolved in 75 ml. of acetone and 2.5 ml. of concentrated hydrochloric acid and the mixture allowed to stand at room temperature for 5 days. The reaction mixture is concentrated in vacuo and the residue taken up in ether. Upon evaporation the desired D-(+)-threo-1-p-nitrophenyl-2-amino-3-palmitoyloxypropane-1-ol hydrochloride crystallizes out; $[\alpha]_D^{26} = +9.5°$ in absolute alcohol (0.9%). The formula of this product is

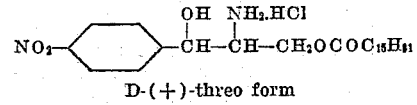

D-(+)-threo form (c) A suspension of 2.4 g. of D-(+)-threo-1-p-nitrophenyl-2-amino-3-palmitoyloxypropane-1-ol hydrochloride in a solution of 1.3 g. of dichloroacetic anhydride and 40 ml. of benzene is heated at reflux for 24 hours. Insoluble material is separated by filtration and discarded. The filtrate is concentrated to 15 ml. and diluted to turbidity with petroleum ether. Upon cooling an oil layer separates. The oil layer is collected and washed with small amounts of water followed by washing with sodium bicarbonate solution. The washed oil layer is taken up in a minimum of hot xylene and after standing at a temperature of about 0 to 10° C., the desired D-(+)-threo-1-p-nitrophenyl-2-dichloroacetamido-3-palmitoyloxypropane-1-ol crystallizes out and is recovered. This product which is a white crystalline solid melts at 90° C.

after recrystallization from xylene. $[\alpha]_D^{26}=+5.1°$ in ethyl acetate. It has the formula

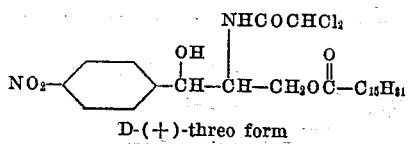

D-(+)-threo form

Example 5

(a) A suspension of 58.3 g. of benzaldehyde and 106 g. of D-(−)-threo-1-p-nitrophenyl-2-aminopropane-1,3-diol in 600 ml. of absolute ethanol is heated at reflux for 6 hours. The reaction mixture is concentrated in vacuo and cooled. The desired product having the formula

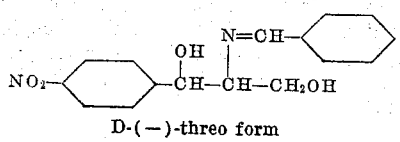

D-(−)-threo form precipitates out and is filtered and recrystallized from ethanol; $[\alpha]_D^{26}=-130°$ in absolute ethanol (1.52%).

A solution of 15 g. of D-(−)-threo-1-p-nitrophenyl-2-benzalaminopropane-1,3-diol, 6 ml. of anhydrous pyridine, and 80 ml. of anhydrous dimethyl formamide is stirred rapidly while 14 g. of palmitoyl chloride is added drop-wise. The mixture is stirred for 4 hours and then poured into a large excess of water with rapid stirring. The product which separates in a supernatant layer is D-(+)-threo-1-p-nitrophenyl-2-benzalamino-3-palmitoyloxypropane-1-ol. The formula of this product is

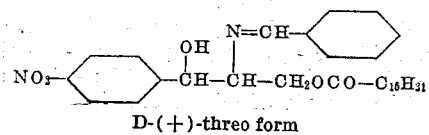

D-(+)-threo form (b) 15.5 g. of D-(−)-threo-1-p-nitrophenyl-2-benzalamino-3-palmitoyloxypropane-1-ol obtained in step (a) is dissolved in 75 ml. of 50% aqueous ethanol and 2.5 ml. of concentrated hydrochloric acid and the mixture allowed to stand for one hour at 40° C. The reaction mixture is cooled to room temperature and extracted with ether. The water layer is then shaken with 100 ml. of ether and 100 ml. of saturated aqueous sodium bicarbonate solution until all the solid dissolves. The ether layer is separated, washed with water and dried. Dry hydrogen chloride is bubbled into the ether solution and the desired D-(+)-threo-1-p-nitrophenyl-2-amino-3-palmitoyloxypropane-1-ol hydrochloride which separates collected. This product has the formula

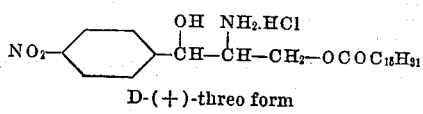

D-(+)-threo form (c) A mixture consisting of 2.4 g. of D-(+)-threo-1-p-nitrophenyl-2-amino-3-palmitoyloxypropane-1-ol hydrochloride, 100 ml. of ether and 100 ml. of a saturated aqueous solution of sodium bicarbonate is shaken until all the solid dissolves. The ether layer is separated, washed with water and dried. Evaporation of the ether yields the desired D-(+)-threo-1-p-nitrophenyl-2-amino-3-palmitoyloxypropane-1-ol. The formula of this product is

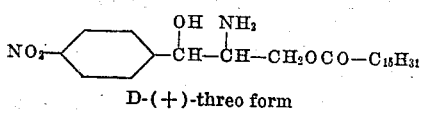

D-(+)-threo form

A solution consisting of 4 g. of D-(+)-threo-1-p-nitrophenyl-2-amino-3-palmitoyloxypropane-1-ol and 20 ml. of methyl dichloroacetate in 40 ml. of methanol is heated under reflux for forty-eight hours. The methanol is removed by distillation and the residue washed with petroleum ether. The solid product is collected, dissolved in xylene and the solution diluted to the point of turbidity with petroleum ether. Upon standing the desired D-(+)-threo-1-p-nitrophenyl-2-dichloroacetamido-3-palmitoyloxypropane-1-ol separates from the solution; M. P. 90° C. after recrystallization from xylene; $[\alpha]_D^{26}=+5.1$ in ethyl acetate. The formula of this product is

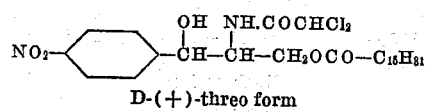

D-(+)-threo form

Example 6

(a) A solution of 52.8 g. of α-fural and 106 g. of DL-threo-1-p-nitrophenyl-2-aminopropane-1,3-diol in 600 ml. of absolute ethanol is heated at reflux for 6 hours. The reaction mixture is concentrated in vacuo and cooled. The product precipitates out and is filtered and recrystallized from ethanol; M. P. 175° C. This product has the formula

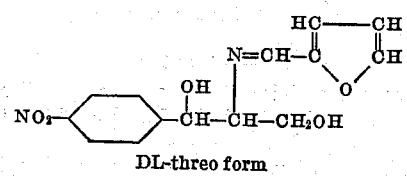

DL-threo form

A solution of 15 g. of DL-threo-1-p-nitrophenyl-2-α-furalaminopropane-1,3-diol, 6 ml. of anhydrous pyridine, and 80 ml. of anhydrous dimethyl formamide is stirred rapidly while 14 g. of palmitoyl chloride is added dropwise. The mixture is stirred for four hours and then poured into a large excess of water with rapid stirring. The product which separates in a supernatant layer is DL-threo-1-p-nitrophenyl-2-α-furalamino-3-palmitoyloxypropane-1-ol. The formula of this product is

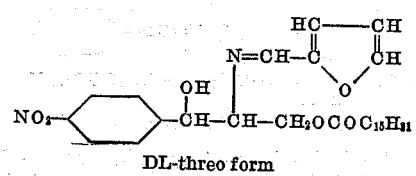

DL-threo form (b) 6 g. of DL-threo-1-p-nitrophenyl-2-α-furalamino-3-palmitoyloxypropane-1-ol obtained in step (a) is dissolved in 30 ml. of acetone and 1.0 ml. of concentrated hydrochloric acid and the mixture is allowed to stand at room temperature for 20 hours. The reaction mixture is concentrated in vacuo and the residue extracted with ether. The ether insoluble material is stirred with aqueous sodium bicarbonate solution and extracted with ether. This ether extract is dried and treated with an excess of dry hydrogen chloride which carries the desired DL-threo-1-p-nitrophenyl-2-amino-3-palmitoyloxypropane-1-ol hydrochloride to separate from the solution. The product is collected and recrystallized from ethyl acetate; M. P. 147–149° C. The formula of this product is

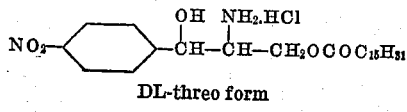

DL-threo form (c) A suspension of 2.4 g. of DL-threo-1-p-nitrophenyl-2-amino-3-palmitoyloxypropane-1-ol hydrochloride in a solution of 1.3 g. of dichoroacetic anhydride and 40 ml. of benzene is heated at reflux for 24 hours. Insoluble material is separated by filtration and discarded. The filtrate is concentrated to 15 ml. and diluted to turbidity with petroleum ether. Upon cooling an oil layer separates. The oil layer is collected and washed with small amounts of water followed by washing with sodium bicarbonate solution. The washed oil layer is taken up in a minimum of hot xylene and after standing at a temperature of about 0 to 10° C., the desired DL-threo-1-p-nitrophenyl - 2 - dichloroacetamido - 3 - palmitoyloxypropane-1-ol crystallizes out and is recovered. This product which is a white crystalline solid melts at 90–91° C. after recrystallization from xylene. It has the formula

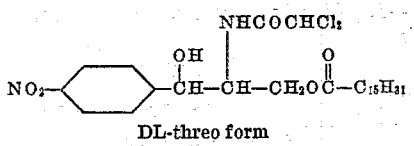

DL-threo form

*Example 7*

(a) A suspension of 58.3 g. of benzaldehyde and 106 g. of L-(+)-threo-1-p-nitrophenyl-2-aminopropane-1,3- diol in 600 ml. of absolute ethanol is heated at reflux for 6 hours. The reaction mixture is concentrated in vacuo and cooled. The product has the formula

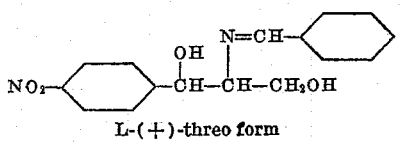

L-(+)-threo form precipitates out and is filtered and recrystallized from ethanol: M. P.=148–149° C.; $[\alpha]_D^{26}=+130°$ in absolute ethanol (1.52%).

A solution of 15 g. of L-(+)-threo-1-p-nitrophenyl-2-benzalaminopropane-1,3-diol, 6 ml. of anhydrous pyridine, and 80 ml. of anhydrous dimethyl formamide is stirred rapidly while 14 g. of palmitoyl chloride is added drop-wise. The mixture is stirred for 4 hours and then poured into a large excess of water with rapid stirring. The product which separates in a supernatant layer is L - (—) - threo - 1 - p - nitrophenyl - 2 - benzalamino - 3 - palmitoyloxypropane-1-ol. The formula of this product is,

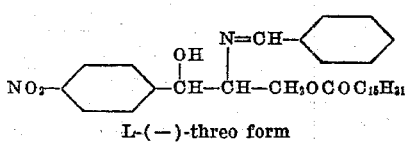

L-(—)-threo form (b) The L - (—) - threo - 1 - p - nitrophenyl - 2 - benzalamino-3-palmitoyloxypropane-1-ol obtained in step (a) is dissolved in about 300 ml. of ether and the solution is saturated with hydrogen chloride gas. Dilution with ether and saturation with hydrogen chloride is continued intermittently for two weeks. The desired L-(—) - threo - 1 - p - nitrophenyl - 2 - amino-3-palmitoyloxypropane-1-ol hydrochloride separates in the form of a white solid and is collected and recrystallized from ethyl acetate; M. P. 126–127° C.; $[\alpha]_D^{26}=-6.2°$ in dimethyl acetamide (1.46%) and —9.5° in absolute ethanol (0.9%). The formula of this product is

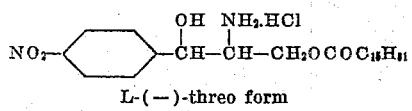

L-(—)-threo form (c) A suspension of 2.4 g. of L-(—)-threo-1-p-nitrophenyl - 2 - amino - 3 - palmitoyloxypropane - 1 - ol hydrochloride in a solution of 1.3 g. of dichloroacetic anhydride and 40 ml. of benzene is heated at reflux for 24 hours. Insoluble material is separated by filtration and discarded. The filtrate is concentrated to 15 ml. and diluted to turbidity with petroleum ether. Upon cooling an oil layer separates. The oil layer is collected and washed with small amounts of water followed by washing with sodium bicarbonate solution. The washed oil layer is taken up in a minimum of hot xylene and after standing at a temperature of about 0 to 10° C., the desired L - (—) - threo - 1 - p - nitrophenyl - 2 - dichloroacetamido - 3 - palmitoyloxypropane-1-ol crystallizes out and is recovered. This product which is a white crystalline solid melts at 87–89° C. after recrystallization from xylene; $[\alpha]_D^{26}=-5.1°$ in ethyl acetate. It has the formula

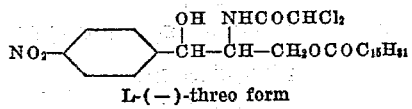

L-(—)-threo form (d) A mixture consisting of 2.4 g. of L-(—)-threo-1-p-nitrophenyl - 2 - amino - 3 - palmitoyloxypropane 1-ol-hydrochloride, 100 ml. of ether and 100 ml. of a saturated aqueous solution of sodium bicarbonate is shaken until all the solid dissolves. The ether layer is separated, washed with water and dried. Evaporation of the ether yields the desired L-(—)-threo-1-p-nitrophenyl-2-amino-3-palmitoyloxypropane-1-ol which after recrystallization from isopropanol melts at 78–79° C. The formula of this product is

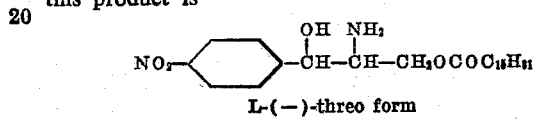

L-(—)-threo form

A solution consisting of 4 g. of L-(—)-threo-1-p-nitrophenyl - 2 - amino - 3 - palmitoyloxypropane - 1 - ol and 20 ml. of methyl dichloroacetate in 40 ml. of methanol is heated under reflux for forty-eight hours. The methanol is removed by distillation and the residue washed with petroleum ether. The solid product is collected, dissolved in xylene and the solution diluted to the point of turbidity with petroleum ether. Upon standing the desired L-(—)-threo-1-p-nitrophenyl-2-dichloroacetamido - 3 - palmitoyloxypropane - 1 - ol separates from the solution; M. P. 87–89° C.; —5.1° in ethyl acetate. The formula of this product is

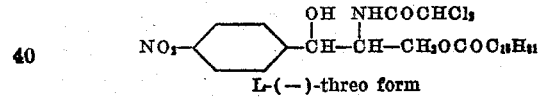

L-(—)-threo form

The Schiff bases employed as starting materials can be prepared by reacting threo-1-p-nitrophenyl-2-aminopropane-1,3-diol with benzaldehyde, substituted benzaldehyde or a heterocyclic aldehyde such as furfural. Preferably the reaction is carried out at reflux temperatures in an inert anhydrous organic medium. The starting materials are heated together until the reaction is substantially complete and the reaction mixture is concentrated in vacuo and cooled. The desired Schiff base precipitates out and, if desired, can be purified according to known procedures.

What I claim is:

1. Process which comprises reacting a Schiff base of formula

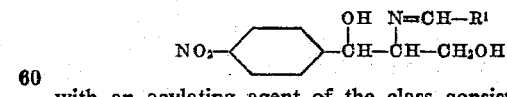

with an acylating agent of the class consisting of acyl halides RCOX and acyl anhydrides (RCO)₂O under anhydrous conditions in a basic medium, thereby producing a 3-acyloxy compound of formula

and hydrolyzing said 3-acyloxy compound under aqueous conditions in the presence of mineral acid to produce a mineral acid addition salt of 1-p-nitrophenyl-2-amino-3-acyloxypropane-1-ol where R is alkyl containing seven to nineteen carbon atoms inclusive, and $R^1$ is a member of the class consisting of phenyl, methoxyphenyl, hydroxyphenyl, chlorophenyl, nitrophenyl, methylphenyl, and furyl.

2. Process which comprises reacting a Schiff base of formula

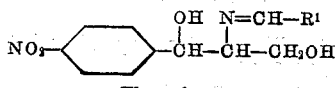
Threo form with an acylating agent of the class consisting of acyl halides RCOX and acyl anhydrides (RCO)₂O under anhydrous conditions in a basic medium, thereby producing a 3-acyloxy compound of formula

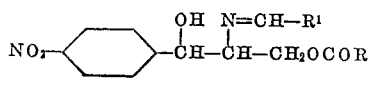
Threo form hydrolyzing said 3-acyloxy compound under aqueous conditions in the presence of mineral acid to produce a mineral acid addition salt of 1-p-nitrophenyl-2-amino-3-acyloxypropane-1-ol where R is alkyl containing seven to nineteen carbon atoms inclusive, and R¹ is a member of the class consisting of phenyl, methoxyphenyl, hydroxyphenyl, chlorophenyl, nitrophenyl, methylphenyl, and furyl.

3. Process which comprises reacting a Schiff base of formula,

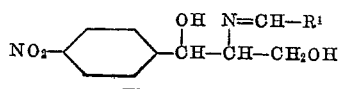
Threo form with an approximately equivalent quantity of an acylating agent of the class consisting of acyl halides RCOX and acyl anhydrides (RCO)₂O under anhydrous conditions in a basic medium at a temperature not substantially over 50° C., thereby producing a 3-acyloxy compound of formula

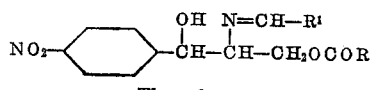
Threo form hydrolyzing said 3-acyloxy compound under aqueous conditions in the presence of mineral acid to produce a mineral acid addition salt of 1-p-nitrophenyl-2-amino-3-acyloxypropane-1-ol, where R is alkyl containing seven to nineteen carbon atoms inclusive, and R¹ is a member of the class consisting of phenyl, methoxyphenyl, hydroxyphenyl, chlorophenyl, nitrophenyl, methylphenyl, and furyl.

4. Process for producing a compound of formula

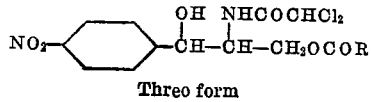
Threo form which comprises reacting a Schiff base of formula

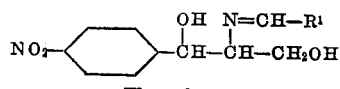
Threo form with an approximately equivalent quantity of an acylating agent of the class consisting of acyl halides RCOX and acyl anhydrides (RCO)₂O under anhydrous conditions in a basic medium at a temperature not substantially over 50° C., thereby producing a 3-acyloxy compound of formula

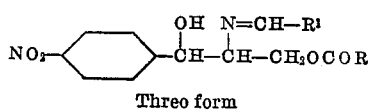
Threo form hydrolyzing said 3-acyloxy compound under aqueous conditions in the presence of a mineral acid to produce a mineral acid addition salt of 1-p-nitrophenyl-2-amino-3-acyloxypropane-1-ol, and N-dichloroacetylating with di-chloroacetic anhydride; where R is alkyl containing seven to nineteen carbon atoms inclusive, and R¹ is a member of the class consisting of phenyl, methoxyphenyl, hydroxyphenyl, chlorophenyl, nitrophenyl, methylphenyl, and furyl.

5. Process for producing threo-1-p-nitrophenyl-2-dichloroacetamido-3-acyloxypropane-1-ol of formula

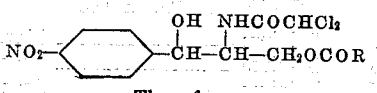
Threo form which comprises reacting a threo-1-p-nitrophenyl-2-benzalaminopropane - 1,3 - diol with an approximately equivalent quantity of an acylating agent of the class consisting of acyl halides RCOX and acyl anhydrides (RCO)₂O under anhydrous conditions in a basic medium at a temperature not substantially over 50° C., thereby producing a threo-1-p-nitrophenyl-2-benzalamino-3-acyloxypropane-1-ol, hydrolyzing said benzalaminoacyloxypropane under aqueous conditions in the presence of a mineral acid at a temperature not substantially over 50° C. to produce a mineral acid addition salt of a threo-1-p-nitrophenyl-2-amino-3-acyloxypropane-1-ol, and N-dichloroacetylating said aminopropane compound; where R is alkyl containing from seven to nineteen carbon atoms inclusive.

6. Process which comprises reacting D-(—)-threo-1-p-nitrophenyl-2-benzalaminopropane-1,3-diol with a substantially equivalent amount of a palmitoyl halide under anhydrous conditions in dimethyl formamide at a temperature not substantially over 50° C. to produce D-(+) - threo - 1 - p - nitrophenyl - 2 - benzalamino - 3 - palmitoyloxypropane-1-ol, hydrolyzing said benzalaminopalmitoyloxypropane with an acid to produce an acid addition salt of D-(+)-threo-1-p-nitrophenyl-2-amino-3-palmitoyl-oxypropane-1-ol.

7. Process which comprises reacting a threo-1-p-nitrophenyl-2-benzalaminopropane-1,3-diol with a substantially equivalent amount of an acylating agent of the class consisting of a palmitoyl halide and palmitic anhydride under anhydrous conditions in a basic medium at a temperature not substantially over 50° C. thereby producing a threo - 1-p-nitrophenyl-2-benzalamino-3-palmitoyloxypropane-1-ol, hydrolyzing said benzalamino-3-palmitoyloxypropane compound with an acid to produce an acid addition salt of threo-1-p-nitrophenyl-2-amino-3-palmitoyloxypropane-1-ol.

8. A compound of formula

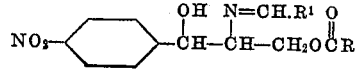

where R is alkyl containing 7 to 19 carbon atoms and R¹ is a member of the class consisting of phenyl, methoxyphenyl, hydroxyphenyl, chlorophenyl, nitrophenyl, methylphenyl, and furyl.

9. 1 - p - Nitrophenyl - 2 - benzalamino - 3 -palmitoyloxypropane-1-ol.

10. Process for producing a compound of formula

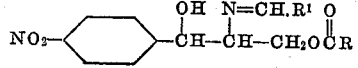

which comprises reacting a compound of formula

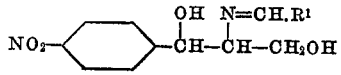

with an acylating agent containing the radical RCO under anhydrous conditions in a basic medium where R is alkyl having 7 to 19 carbon atoms.

11. Process for producing 1-p-nitrophenyl-2-benzalamino-3-palmitoyloxypropane-1-ol which comprises reacting 1 - p-nitrophenyl-2-benzalaminopropane-1,3-diol with an approximately equivalent quantity of palmitoyl chloride in anhydrous dimethyl formamide at a temperature not substantially over 50° C.

References Cited in the file of this patent

UNITED STATES PATENTS

| | | |
|---|---|---|
| 2,483,884 | Crooks et al. | Oct. 4, 1949 |

FOREIGN PATENTS

| | | |
|---|---|---|
| 501,678 | Belgium | Mar. 31, 1951 |
| 503,348 | Belgium | June 15, 1951 |
| 503,675 | Belgium | June 30, 1951 |

OTHER REFERENCES

Iliceto et al.: "Gazz. Chim. Ital," vol. 81 (1951), pp. 133–41.

Ueyanagi: "J. Pharm. Soc. Japan," vol. 71, No. 12, Dec. 1951, pp. 1409–19.

Cestari et al.: "Farm. Sci. e Tec. (Pavia), vol. 5 (1950), pp. 649–53.